US012801456B2

(12) United States Patent
Perumalla et al.

(10) Patent No.: US 12,801,456 B2
(45) Date of Patent: Nov. 17, 2026

(54) DISTRIBUTED COMPUTING TASKS AMONG POOL OF REGISTERED NODES

(71) Applicant: International Business Machines Corporation, Armonk, NY (US)

(72) Inventors: Saraswathi Sailaja Perumalla, Visakhapatnam (IN); Gautam Zalpuri, Littleton, MA (US); Ryan Jackson, Blue Bell, PA (US); Raghupatruni Nagesh, Visakhapatnam (IN); Rajesh Kumar Boda, Visakhapatnam (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 739 days.

(21) Appl. No.: 17/476,038

(22) Filed: Sep. 15, 2021

(65) Prior Publication Data

US 2023/0082680 A1 Mar. 16, 2023

(51) Int. Cl.
*G06F 9/50* (2006.01)
*G06F 9/48* (2006.01)

(52) U.S. Cl.
CPC .......... *G06F 9/5083* (2013.01); *G06F 9/4881* (2013.01)

(58) Field of Classification Search
CPC ..... G06F 9/5083; G06F 9/4881; G06F 9/5066
See application file for complete search history.

(56) References Cited

U.S. PATENT DOCUMENTS 9,659,081 B1 * 5/2017 Ghodsi ................. G06F 16/285
10,360,606 B2 7/2019 Nedeltchev
11,055,639 B1 * 7/2021 Cay ........................ G06Q 10/04
11,652,746 B1 * 5/2023 Sorenson, III ........ H04L 9/0643 370/235
2010/0332262 A1 12/2010 Horvitz
2011/0041136 A1 * 2/2011 Messier ................ G06F 9/5066 718/105
2014/0157363 A1 * 6/2014 Banerjee ................ H04L 63/10 726/2
2016/0080477 A1 * 3/2016 Nedeltchev ............ H04L 67/10 709/218

(Continued)

OTHER PUBLICATIONS

Anderson; "Boinc: A System for Public-Resource Computing and Storage"; Fifth IEEE/ACM International Workshop on Grid Computing; 2004.

(Continued)

*Primary Examiner* — Bradley A Teets
*Assistant Examiner* — Willy W Huaracha
(74) *Attorney, Agent, or Firm* — Amin, Turocy & Watson, LLP

(57) ABSTRACT

The present specification describes a computer-implemented method. According to the method, a request is received to execute a computing task. The request includes parameters for the computing task. A processor identifies, based on the parameters for the computing task and from a pool of registered nodes, a set of assigned nodes amongst which the computing task is to be distributed. A computing assignment of the computing task is transmitted to a secure and isolated container on each of the assigned nodes. A completed computing assignment is received from each of the assigned nodes and the completed computing task is assembled and distributed to a requesting device.

19 Claims, 7 Drawing Sheets

(56) References Cited

U.S. PATENT DOCUMENTS

| | | | | |
|---|---|---|---|---|
| 2016/0098292 | A1* | 4/2016 | Boutin | G06F 9/4881 718/104 |
| 2016/0155442 | A1* | 6/2016 | Kannan | G06F 3/167 704/275 |
| 2016/0277488 | A1* | 9/2016 | Fallon | H04L 67/1031 |
| 2017/0228245 | A1* | 8/2017 | Hardy | G06F 9/45558 |
| 2018/0248780 | A1* | 8/2018 | Jiang | G06F 9/455 |
| 2019/0004868 | A1* | 1/2019 | Zhou | G06T 1/20 |
| 2019/0190789 | A1* | 6/2019 | Zhang | H04L 67/1008 |
| 2019/0334716 | A1 | 10/2019 | Kocsis | |
| 2022/0045930 | A1* | 2/2022 | Williams | H04L 43/50 |
| 2022/0107834 | A1* | 4/2022 | Harris | G06F 9/485 |
| 2022/0413920 | A1* | 12/2022 | Nizar | G06F 9/5038 |
| 2023/0041845 | A1* | 2/2023 | Tsirkin | G06F 9/5077 |

OTHER PUBLICATIONS

Becker; "Linked and Semantically Enriched Crowdsourced Cloud Computing Location Data"; Oct. 26, 2015; https://snet.tu-berlin.de/fileadmin/fg220/theses/archive/Becker_2015_-Linked_and_Semantically_Enriched_Crowdsourced.pdf.

Boinc—Compute for Science; https://boinc.berkeley.edu/; Retrieved online on Sep. 9, 2021.

Li; CrowdBC: A Blockchain-based Decentralized Framework for Crowdsourcing; Nov. 19, 2018.

Hosseini; Crowdcloud: a crowdsourced system for cloud infrastructure; Aug. 30, 2018.

Hosseini; Crowdcloud: Cloud of the Crowd; Aug. 2017.

Mell; "The NIST Definition of Cloud Computing"; National Institute of Standards and Technology; Sep. 2011.

Yao, et al; Using Crowdsourcing to Provide QoS for Mobile Cloud Computing; Dec. 2015.

SETI@home, Wikipedia—The Free Encyclopedia, May 17, 1999, 12 pages.

Shi et al., "Edge Computing: Vision and Challenges", IEEE Internet of Things Journal, vol. 3, No. 5, Oct. 2016, 10 pages.

* cited by examiner

DISTRIBUTED COMPUTING TASKS AMONG POOL OF REGISTERED NODES

BACKGROUND

The present invention relates to the distribution of a computing task amongst multiple assigned nodes, and more specifically to the distribution of such to secure and isolated containers on each assigned node.

SUMMARY

According to an embodiment of the present invention, a computer-implemented method is described. According to the method, a computing device receives a request to execute a computing task. The computing task includes parameters for the computing task. Based on the parameters for the computing task and from a pool of registered nodes, the computing device identifies a set of assigned nodes amongst which the computing task is to be distributed. A computing assignment of the computing task is transmitted to a secure and isolated container on each of the assigned nodes. The computing device receives an associated completed computing assignment from each of the assigned nodes and assembles and distributes a completed computing task to a requesting device.

The present specification also describes a computing device. The computing device includes a database of capabilities and usage of registered nodes to which computing assignments of a computing task are to be distributed. The computing device also includes a processor. The processor analyzes a request to execute a computing task. That request includes parameters for the computing task. The processor is to select, based on the request and capabilities of registered nodes, a set of assigned nodes amongst which the computing task is to be distributed. Following completion of the task, the processor assembles completed computing assignments into a completed computing task and distributes the completed computing task to a requesting device. The computing device also include a transceiver. The transceiver transmits, to a secure and isolated container on each of the assigned nodes, a computing assignment of the computing task. The isolated container is not accessible by other applications of the assigned node and is incapable of accessing the other applications of the assigned node. The transceiver receives, from each of the assigned nodes, an associated completed computing assignment.

The present specification also describes a computer program product. The computer program product includes a computer readable storage medium having program instructions embodied therewith. The program instructions executable by a processor, to cause the processor to receive, by the processor, a request to execute a computing task, wherein the request comprises parameters for the computing task. The program instructions are also executable by the processor to identify, by the processor and based on the parameters for the computing task, a set of assigned nodes from a pool of registered nodes amongst which the computing task is to be distributed. The program instructions are also executable by the processor to transmit, by the processor and to a secure and isolated container on each of the assigned nodes, a computing assignment of the computing task. The program instructions are also executable by the processor to receive, by the processor and from each of the assigned nodes, an associated completed computing assignment; assemble, by the processor, a completed computing task from associated completed computing assignments; and distribute, by the processor, the completed computing task to a requesting device.

DETAILED DESCRIPTION

Figure 1:
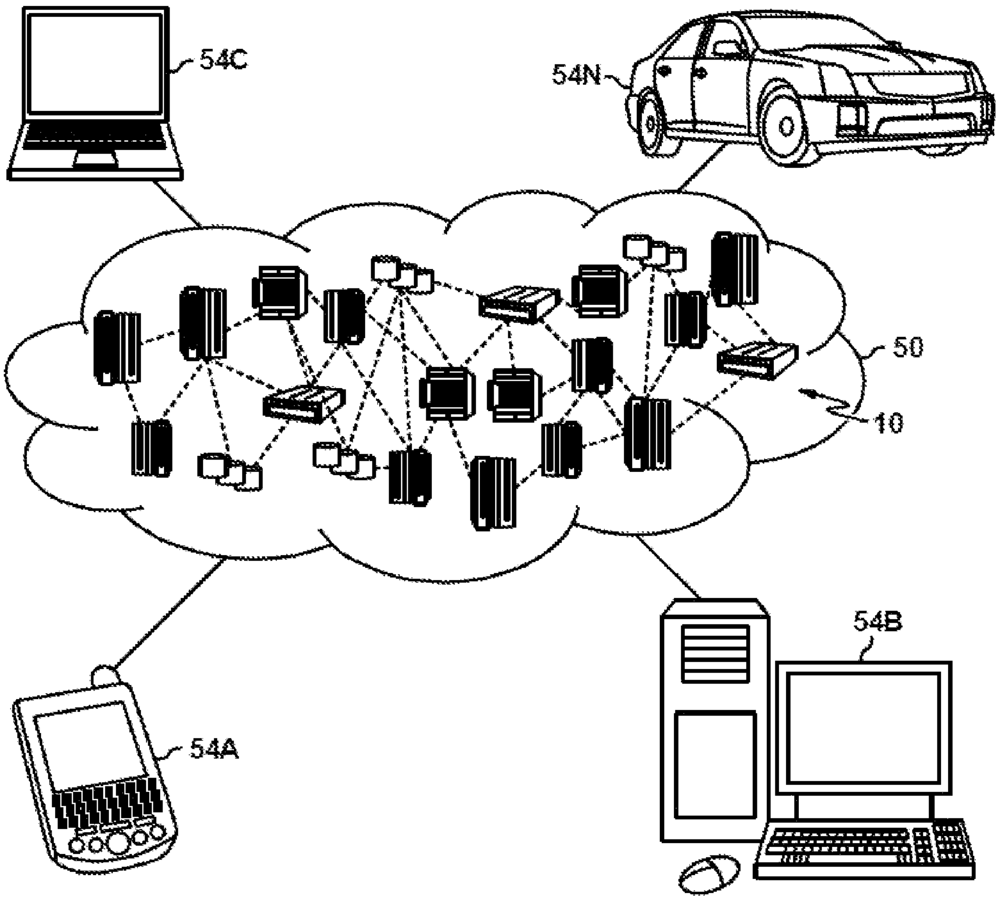
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing devices are relied on daily by millions of peoples. Computing devices include hardware components that carry out any number of operations. For example, computing devices have processors and memory that cooperate to perform a variety of operations. It may be the case that a computing device has a computing task, i.e., some digital operation to execute, that may consume more resources than the computing device physically has available. For example, a computing device may want to process a large amount of data, but may not have the computing resources to store and/or operate on the large amount of data. Rather than purchasing the extra computing resources, the system of the present specification provides the additional resources to a user via a pool of registered nodes. These nodes may be general public personal use computers on a public network or entity-owned computing devices on a private network. That is, computing devices may not always be active. For example, a personal user computer may not be utilizing its processor and/or memory during hours of the day when a user is asleep. The present specification describes a system where users with computing devices, which are securely available on a network, can offer their computing resources to an entity which is requesting additional resources to complete a large task.

Put another way, the present specification relies on the vast worldwide network of computing resources to execute computing tasks. More specifically, the sourcing of the computing devices to accomplish these tasks is brokered to ensure a threshold level of quality of service, and security for both the nodes (i.e., those computing devices offering processing resources) and a requesting device. As such, the present specification provides an approach to implement brokered transactions for computing tasks and the distributed compute capacity available with an agreed upon quality of service (QoS), security, and reliability. Accordingly, the computing device in this example may be a broker which provides an interface wherein a requesting device can request additional computing resources to complete a task and where nodes, i.e., computing devices such as laptops, desktop computers, enterprise computers, etc., can register to provide the additional capacities that will be used to accomplish the task. The broker device does so, all while providing security, and a threshold level of service for the nodes and a requesting device.

Such a system, method, and computer program product may 1) provide for distributed computing task completion, 2) ensure security during distributed execution, 3) mediates nodes with resources to offer and requesting devices requesting resources to complete a task, and 4) is scalable to any size of pool of registered nodes and computing tasks.

As used in the present specification and in the appended claims, the term “registered node” refers to a computing device that is registered with the system to potentially provide computing resources to accomplish a distributed task. By comparison, the term “assigned node” refers to a computing device within the pool of registered nodes that has been selected and assigned a particular computing assignment associated with a distributed task.

As used in the present specification and in the appended claims, the term “a number of” or similar language is meant to be understood broadly as any positive number including 1 to infinity.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service’s provider.

Broad network access: capabilities are available over a network and accessed through standard mechanisms that promote use by heterogeneous thin or thick client platforms (e.g., mobile phones, laptops, and PDAs).

Resource pooling: the provider’s computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider’s applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

While it is understood that the process software may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Referring now to FIG. 1, illustrative cloud computing environment (50) is depicted. As shown, cloud computing environment (50) includes one or more cloud computing nodes (10) with which local computing devices used by cloud consumers, such as, for example, personal digital assistant (PDA) or cellular telephone (54A), desktop computer (54B), laptop computer (54C), and/or automobile computer system (54N) may communicate. Nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A-N) shown in FIG. 1 are intended to be illustrative only and that computing nodes 10 and cloud computing environment 50 can communicate with any type of computerized device over any type of network and/or network addressable connection (e.g., using a web browser).

Figure 2:
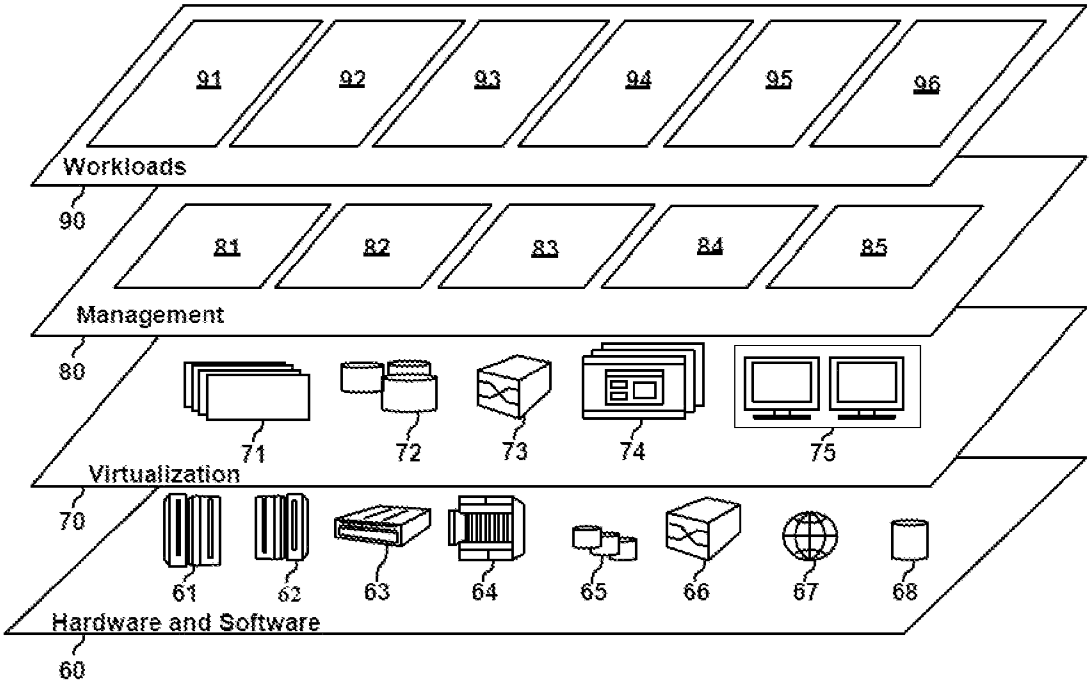
FIG. 2 depicts abstraction model layers according to an embodiment of the present invention.

Referring now to FIG. 2, a set of functional abstraction layers provided by cloud computing environment (50) (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer (60) includes hardware and software components. Examples of hardware components include: mainframes (61); RISC (Reduced Instruction Set Computer) architecture based servers (62); servers (63); blade servers (64); storage devices (65); and networks and networking components (66). In some embodiments, software components include network application server software (67) and database software (68).

Virtualization layer (70) provides an abstraction layer from which the following examples of virtual entities may be provided: virtual servers (71); virtual storage (72); virtual networks (73), including virtual private networks; virtual applications and operating systems (74); and virtual clients (75).

In one example, management layer (80) may provide the functions described below. Resource provisioning (81) provides dynamic procurement of computing resources and other resources that are utilized to perform tasks within the cloud computing environment. Metering and Pricing (82) provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal (83) provides access to the cloud computing environment for consumers and system administrators. Service level management (84) provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer (90) provides examples of functionality for which the cloud computing environment may be utilized. Examples of workloads and functions which may be provided from this layer include: mapping and navigation (91); software development and lifecycle management (92); virtual classroom education delivery (93); data analytics processing (94); transaction processing (95); and electronic file segmentation and storage (96).

Figure 3:
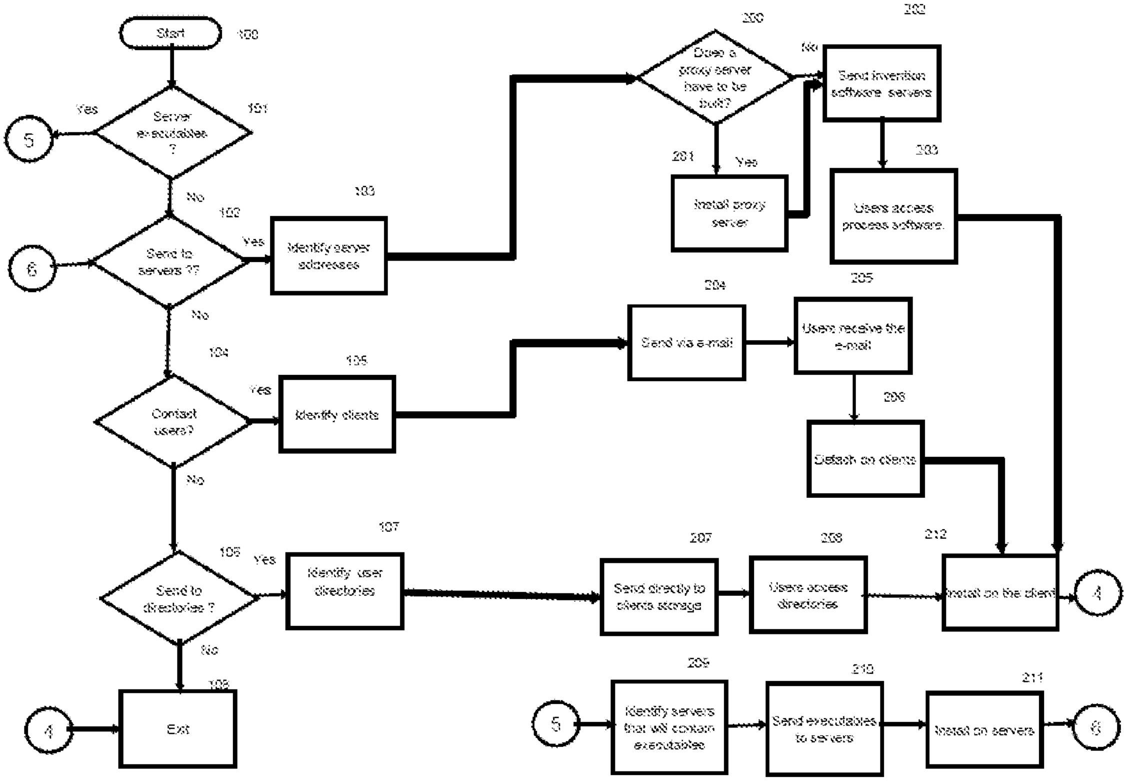
FIG. 3 depicts the deployment of a hypervisor, according to an example of the principles described herein.

FIG. 3 depicts the deployment of a hypervisor, according to an example of the principles described herein. Step 100 begins the deployment of the process software. An initial step is to determine if there are any programs that will reside on a server or servers when the process software is executed (101). If this is the case, then the servers that will contain the executables are identified (209). The process software for the server or servers is transferred directly to the servers' storage via FTP or some other protocol or by copying though the use of a shared file system (210). The process software is then installed on the servers (211).

Next, a determination is made on whether the process software is to be deployed by having users access the process software on a server or servers (102). If the users are to access the process software on servers, then the server addresses that will store the process software are identified (103).

A determination is made if a proxy server is to be built (200) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (201). The process software is sent to the (one or more) servers either via a protocol such as FTP, or it is copied directly from the source files to the server files via file sharing (202). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (203). Another embodiment is to have the servers automatically copy the process software to each client and then run the installation program for the process software at each client computer. The user executes the program that installs the process software on his client computer (212) and then exits the process (108).

In step 104 a determination is made whether the process software is to be deployed by sending the process software to users via e-mail. The set of users where the process software will be deployed are identified together with the addresses of the user client computers (105). The process software is sent via e-mail to each of the users' client computers. The users then receive the e-mail (205) and then detach the process software from the e-mail to a directory on their client computers (206). The user executes the program that installs the process software on his client computer (212) and then exits the process (108).

Lastly, a determination is made on whether the process software will be sent directly to user directories on their client computers (106). If so, the user directories are identified (107). The process software is transferred directly to the user's client computer directory (207). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (208). The user executes the program that installs the process software on his client computer (212) and then exits the process (108).

Figure 4:
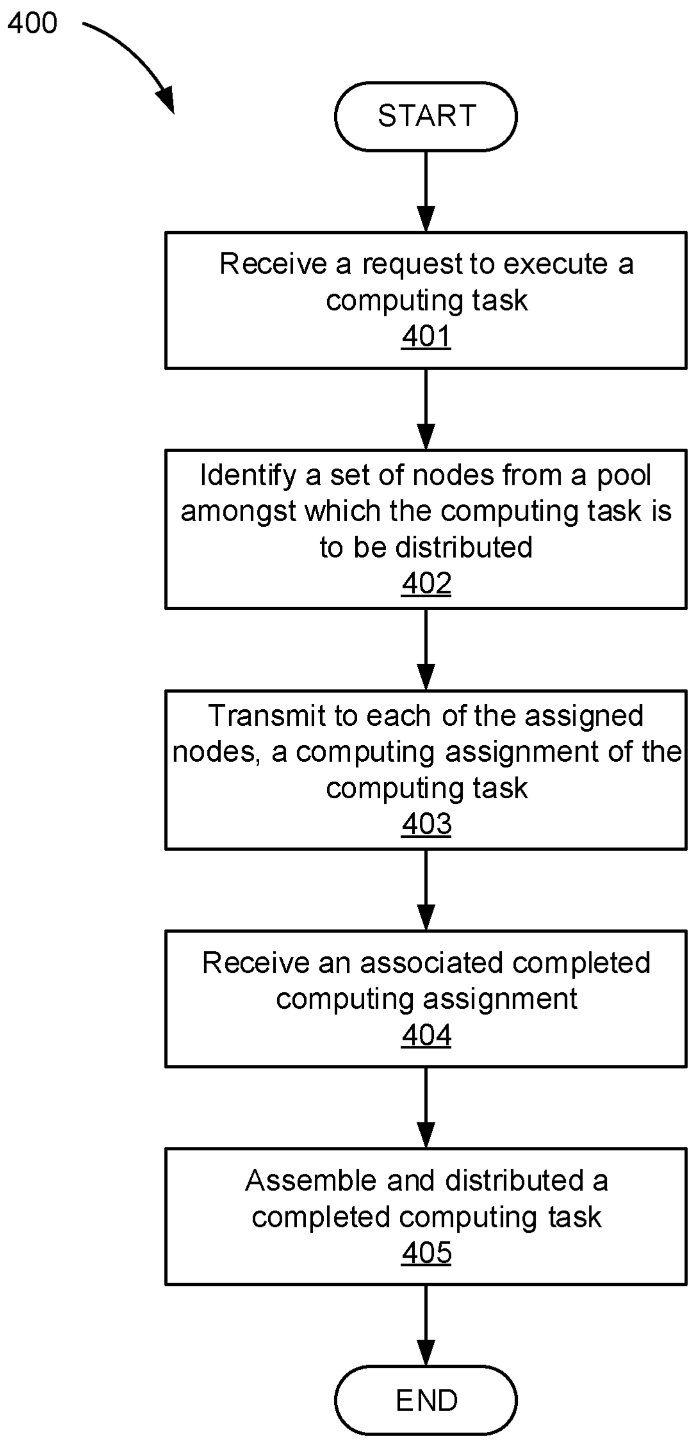
FIG. 4 depicts a computer-implemented method for distributing a computing task amongst multiple registered nodes, according to an example of the principles described herein.

FIG. 4 depicts a computer-implemented method (400) for distributing a computing task amongst multiple registered nodes, according to an example of the principles described herein. That is, the computer-implemented method (400) may be implemented in a computing device to facilitate completion of a computing task by registered computing nodes that may have resources unavailable to a device requesting the computing task.

According to the method (400), the computing device receives (block 401) a request to execute a computing task. The computing task may be any variety of tasks. Examples include image rendering, data analysis, data mining or any variety of operation. Other specific examples of computing tasks that may be requested include predictive modeling and other data science experiments, sorting and searching large datasets, brute force decryption, mathematical and statistic computations, and video and image processing at scale such as applying a filter to millions of images or applying closed captions to millions of video files, among others. While particular reference is made to a few computing tasks that may be requested, requests for the execution of other computing tasks may also be received (block 401).

The request may be received (block 401) via a user interface. For example, the computing device may present a portal through which a user of the requesting device may submit a request for additional resources to complete a computing task. In some examples, the request may include parameters for completing the computing task. As a particular example, the user interface may include a field wherein a user enters a desired completion date and/or time for the operation. Other examples of parameters that may be defined within the request include, but are not limited to, the processing and memory resources to be utilized to execute the computing task. That is, a user may be able to specify the memory and processing bandwidth targets for the computing task. Other examples of parameters include a quantity of registered nodes to include in the set of nodes that will be assigned the computing task and a security level of the computing task. For example, a user may specify that a particular computing task is to be completed on private network nodes, rather than public network nodes in order to ensure the security of the data being acted upon.

In some examples, the interface may present particular parameters from which the user may select a set. In other examples, the computing device may identify the parameters from other user input. For example, the user may input a priority and desired cost level and the computing device may select one or more parameters based on an input priority and cost level. For example, a user may specify a computing task that they would like completed by a certain date and would like a low-cost option. Responsive to this request, the computing device may identify the number of processing resources and memory resources to allocate to this low-cost computing task to ensure completion by the certain date.

For example, the user interface may present three options from which a user may select for their computing task. A first option may be a low cost and lower priority computing task. Such a task may take advantage of large distribution but with cost constraints and no time constraints. As such, the computing task may take a longer period of time to execute, but may have a lower cost. As another example, a second option may be a higher cost and as such may rely on private network nodes and take priority over lower cost options. As a third option, a hybrid approach may be implemented wherein some computing assignments of the computing task may be deployed to a public networks cloud (i.e., lower cost and lower security) and priority assignments may be deployed to private networks which offer more security but at a higher cost.

The computing device identifies (block 402) a set of nodes from a pool of registered nodes amongst which the computing task is to be distributed. Those registered nodes that are identified (block 402), and to which the computing task is to be assigned may be referred to as assigned nodes. Put another way, assigned nodes are a subset of the registered nodes to which a computing task is to be sent. That is, there may be a pool of computing devices that represent those devices who have opted into and offered the resources of their computing devices for completion of a computing task. Accordingly, the computing device, that is a brokering device, selects from amongst this pool, those nodes which are to be selected to perform the computing task. Such identification (block 402) is based on the parameters for the computing task. For example, as described above, each computing task may be associated with particular parameters. Upon registration to perform computing tasks, each of the nodes may enter certain information such as hardware information (i.e., processing resources available, memory resources available), a type of computing device (i.e., on a public network or private network), and availability, among other information. As such, the computing device identifies those from the registered pool that are capable of performing the computing task as defined by the parameters in the request and selects a number of these registered nodes to complete the task.

The computing device may then transmit (block 403) to each of the selected assigned nodes, a computing assignment of the computing task. For example, a computing task may include a variety of sub-tasks, or assignments, to be executed to complete the computing task. As such, the computing device may split the computing task into divisions, i.e., assignments, and may assign the different computing assignments to the assigned nodes in the set. In some examples, transmitting (block 403) the computing assignments to selected assigned nodes is based on a policy indicating an ability of a registered node to receive a computing assignment. That is, the computing device may include data indicating which nodes may receive tasks, i.e., those that are registered within the pool. As such, the computing device may transit (block 403) the assignments to these assigned nodes.

Further examples of computing tasks to be distributed are now provided. In an example, a data science experiment may be performed where the computing task is to have each assigned node analyze a specific set of data. Another example may be to run a batch job of N steps where each assigned node processes a single step which could include a series of computations. Searching through or sorting of a large dataset could be efficiently performed by submitting a smaller subset of the dataset to each assigned node with the same search or sort operation. Another example is a brute force computing task that applies multiple approaches to a single dataset.

Each of the assigned nodes then completes the assigned computing task. Upon completion of a task, the computing device receives (block 404) an associated completed computing assignment. That is, each assigned node is assigned a computing assignment to complete. When completed, the assigned node sends the completed assignment back to the computing device. The computing device then assembles (block 405) the completed task from the completed assignments and distributes the completed computing task back to the device that initially requested the task.

As such, the present method (400) provides for distributed processing of a dataset. Accordingly, rather than acquiring the resources to complete a task, the user of the computing device may temporarily utilize the resources of multiple other computing devices. By dividing the task into multiple assignments, security of the data set and the task is ensured as no one registered node has access to the entire dataset.

Moreover, it may be that the completion of an assignment may be a background operation and performed automatically. That is, a user of an assigned node may be unaware that the assignment is being completed. More specifically, the receipt of the computing assignment, execution of the computing assignment, and transmission of a computing assignment back to the brokering device may be automatic and not visible to a user of the assigned node. Moreover, such an operation may be performed with an isolated container that is established prior to the assignment of the computing assignment or during registration. This isolated container is isolated from other components and programs of the assigned node such that the other components and applications of the assigned node do not have access to the applications and/or data set within the isolated container that are associated with the computing task. This also provides protection for the assigned node as the components and applications within the isolated container do not have access to the other applications and or data on the assigned node. As such, not only does the present systems and methods provide for distributed computing, but also ensure two-way security for both the assigned node and the data set of the task.

A specific example is now provided. In this example, a node user may have a computing device with good processing capacity and memory. The user may not fully utilize the resources of the computing device and may offer resources of the computing device for completion of computing assignments received from others. In this example, the brokering device presents a user interface wherein the node user may register the computing device in a pool for decentralized processing. Thus, the device becomes a registered node.

Following registration, the brokering device may provide a download package, which may generate a hypervisor on the registered node, which hypervisor establishes the isolated container and manages other aspects of assignment execution as described below. During registration, or sometime after, the brokering device may prompt for certain parameters such as central processing unit (CPU) specifications, RAM capability, etc. With this information provided, the hypervisor on the registered node may provide the information to the brokering device such that the node is included in the pool of registered nodes to which a computing assignment may be delegated.

At the other end, an organization may desire to process a large amount of data and would like to enlist other computing devices on a temporary basis rather than purchasing the resources to accomplish the task. In this example, the brokering device may provide another interface such that the organization may request distributed processing. From this interface, the brokering device may present various options for task completion. This may include a first option which is a low-cost option that may take more time to complete, a second option that is a higher cost option but completed more timely, and a third hybrid option, among others.

In this example, the organization may be sensitive to cost and as such may select the first option and may upload the data to process. As described above, the organization may also specify the time by which the project is to be completed. Based on this information, the brokering device may identify (block 402) a set of assigned nodes from the pool and may create a virtual private network (VPN) amongst the assigned nodes and the computing device. The brokering device may split the data into datasets. An image is created for each dataset and the applications to process the dataset. Each image may be allocated to different assigned nodes in the VPN.

The hypervisors that are running on the different assigned nodes download the respective images allocated to them and process the data by creating an isolated container. Once completed, each completed task is passed to the brokering device where it is assembled and provided to the organization.

Once the results are available from all assigned nodes in the network, each hypervisor deletes the local docker image and removes itself from the VPN. The brokering device collects the processed data from all the assigned nodes, merges the processed data, and makes the processed data ready for the requesting device to download.

Once completed, the hypervisor on each assigned node may collect usage metrics and provide such to a ledger on the brokering device for use in subsequent task distribution. As such, the present method (400) ensures security and fair allocation.

Figure 5:
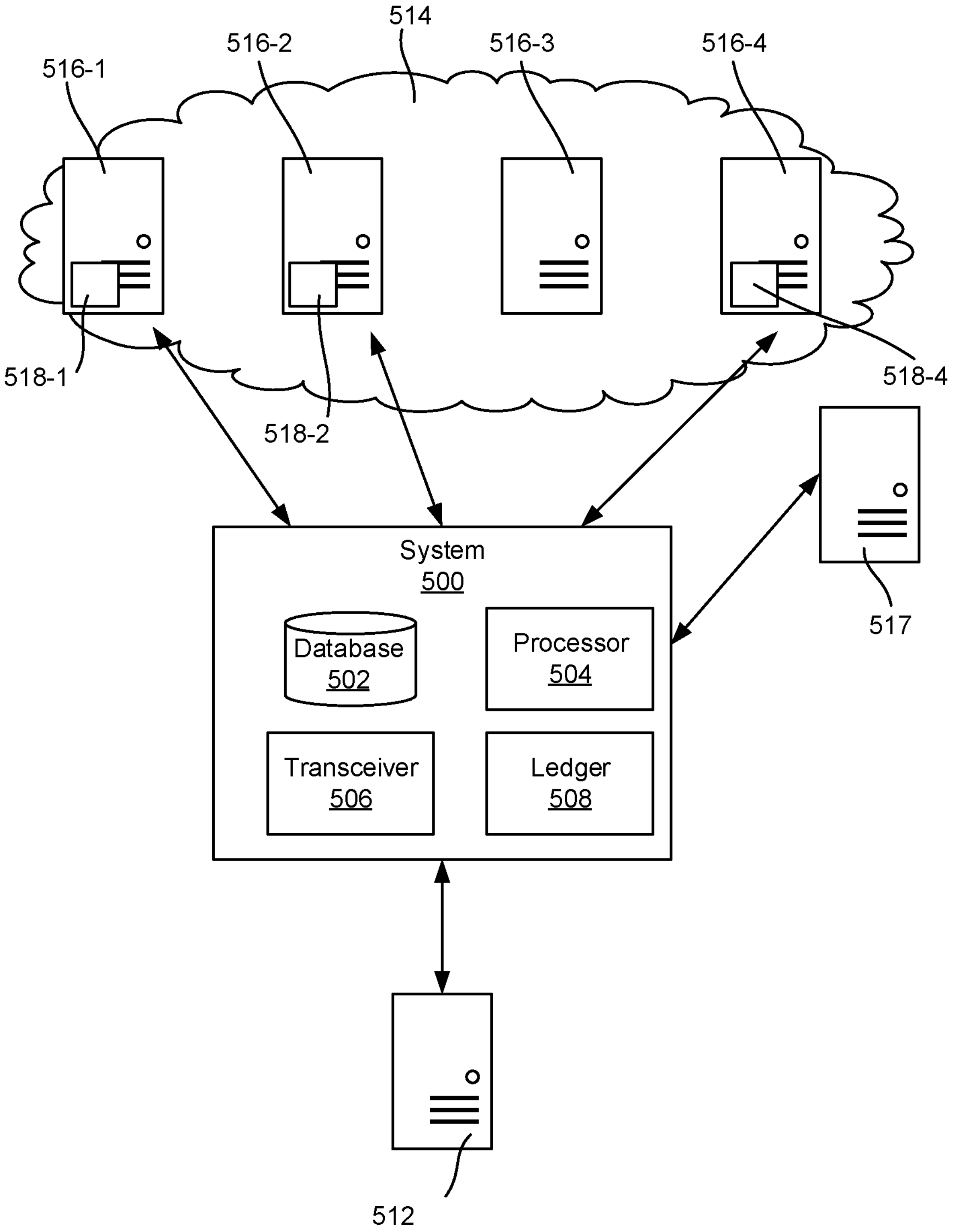
FIG. 5 depicts a system for distributing a computing task amongst multiple registered nodes, according to an example of the principles described herein.

FIG. 5 depicts a system (500) for distributing a computing task amongst multiple registered nodes, according to an example of the principles described herein. To achieve its desired functionality, the system (500) includes various components. Each component may include a combination of hardware and program instructions to perform a designated function. The components may be hardware. For example, the components may be implemented in the form of electronic circuitry (e.g., hardware). Each of the components may include a processor to execute the designated function of the component. Each of the components may include its own processor, but one processor may be used by all the components. For example, each of the components may include a processor and memory. In another example, one processor may execute the designated function of each of the components. The processor may include the hardware architecture to retrieve executable code from the memory and execute the executable code. As specific examples, the components as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the processor cause the processor to implement at least the functionality of distributing a computing task amongst a variety of registered nodes (516).

That is, the system (500) provides for decentralized multi-node execution of a particular computing task wherein a target capacity, quality of service, and security is provided to both the registered nodes (516) and the requesting device (512). As described above, the system (500) registers unregistered nodes (517) and requesting devices (512) while specifying quality of service, availability and security measures. The system (500) may include a processor (504) to execute any number of operations. For example, the processor (504) may analyze a request from a requesting device (512) to execute a computing task. As described above, the request may include parameters for the computing task such as a desired completion date and time as well as an indication of the processing resources and memory resources desired for completion of the task. As described above, such indication may be to select amongst a variety of options, i.e., high priority, low priority, etc. such that parameters for the request are determined based on a selected option.

The system (500) may include a database (502) of capabilities of registered nodes (516) to which computing assignments of a computing task are to be assigned. As described above, upon registration, registered nodes (516) may be prompted to provide certain information such as hardware resource information, memory resource information, and availability of the recourses, i.e., times of day when the resources are available. As such, the system (500) continuously monitors the registered nodes (516), both selected and not selected, as they complete various assignments to build the knowledge corpus of asset resources and their computation usage.

In some examples, the registered nodes (516) may make up a public network, for example where any computing device may register across a general public network. In another example, the registered nodes (516) may make up a private network. For example, a large enterprise may have hundreds of computing devices that could be used to provide private distributed processing.

As such, the processor (504), accessing the database (502) may select a set of the pool (514) of registered nodes (516) that are to receive computing assignments associated with the computing task. That is, the processor (504) designates which registered nodes (516) are to become assigned nodes. For example, a first registered node (516-1), second registered node (516-2), and a fourth registered node (516-4) may be selected as assigned nodes based on their availability matching with a desired time of completion while a third registered node (516-3) may not be selected due to its unavailability within the time window for completion.

The system (500) may include a transceiver (506) which transmits a variety of information and data to the selected assigned nodes. For example, the processor (504) may provide, and the transceiver (506) may transmit, an install package for a hypervisor (518) to be installed on a selected assigned node to manage execution of the computing assignment at the assigned node. The hypervisor (518) that downloads to the assigned nodes may reserve the allocated computing resources and may establish a secure network for communication with the other assigned nodes. That is, in completion of a computing task, different assigned nodes may communicate with one another or the system (500). That is, some computing assignments may be executed sequentially, with the computing assignment executed by one assigned node dependent upon a computing assignment executed by another assigned node. As such, the processor (504) sets up a communication network between the assigned nodes and the system (500).

In general, the hypervisor (518) manages the execution of computing assignments. For example, the hypervisor may download the images and isolated container on each assigned node. The isolated container sets up a space on the assigned node where transactions would be executed to perform the computing assignments. The hypervisor (518) may be above the operating system and may install a container on the assigned node. As the container is isolated from other resources of the assigned node, the operations and applications within the container are inaccessible to other resources of the assigned node and the other resources of the assigned node are inaccessible to the hypervisor (518). Doing so ensures the security of both the data set being operated upon, and the resources that are at the temporary disposal of the requesting device (512) to execute a task.

In summary, the hypervisor (518), sets up the container and downloads applications that are executed to process the data. In this example, the entire application stack is running isolated on assigned nodes. Once completed, the hypervisor (518) and/or container may be deleted or cleaned to maintain the security of both the assigned node resources and the data set acted upon.

Following establishment of the hypervisor (518) and the isolated container, the transceiver (506) transmits other information. For example, the transceiver (506), working in operation with the hypervisor (518) may transmit to a secure and isolated container on each of the assigned nodes, a computing assignment of the computing task. That is, the hypervisor (518) on an assigned node is responsible for downloading and uploading tasks to ensure secure execution, while the containerized image is able to process computing assignments on the assigned node without accessing anything other than the hypervisor-provided resources. Upon the completion of a computing assignment, the results are passed back to the hypervisor (518) and sent to the system (500). That is, the transceiver (506) receives, from each of the assigned nodes, an associated completed computing assignment and the processor (504) assembles the completed computing assignments into a completed computing task and distributes the completed computing task to the requesting device (512).

The processor (504) may execute other operations as well. For example, the processor (504) may manage the addition and removal of assigned nodes from the set to complete a task and addition and removal of nodes into the pool (514). For example, an unregistered node (517) may desire to provide services to the execution of distributed computing. In this example, the processor (504) of the system (500) provides the interface through which information is collected for the unregistered node (517) and policies established with the unregistered node (517) such that the unregistered node (517) may enter the pool (514) as a candidate for selection for computing task assignment. In another example, the processor (504) may manage removal of a registered node (516) from the pool (514), for example based on historically poor performance of computing assignments and/or lack of compliance with policies of the distributed environment. For other reasons, such as user selection, the processor (504) may remove a registered node (516) from the pool (514).

The processor (504) may also manage selection of assigned nodes to perform a computing task. That is, based upon a matching of capabilities from the database (502) with the parameters of a request, the processor (504) may select certain registered nodes (516) to include in the set of assigned nodes which are to provide computing resources. In one particular example, the processor (504) may prevent a registered node (516) from forming part of the set. This may be responsive to the registered node (516) having completed a previous computing assignment for a requesting device (512). That is, to ensure equal distribution of computing assignments across the pool (514) of registered nodes (516), the processor (504) may track the utilization of registered nodes (516), thus ensuring that certain registered nodes (516) are not over or underutilized. Moreover, distributing computing assignments across registered nodes (516) may increase security. For example, a first organization may have previously submitted a request for which the third registered node (516-3) completed an assignment. The first organization may submit a new request. To ensure security, the system (500) may prevent the third registered node (516-3) from performing an assignment associated with the new request such that the third registered node (516-3) does not again have access to a data set from the first organization.

As another example, prevention of usage of a particular registered node (516) may be based on historical performance of the registered node (516). For example, it may be that certain registered nodes (516) do not perform operations as established during registration. As such, these registered nodes (516) may be considered for a set when a low cost and flexible performance option is selected, but may be prevented from forming a set when a higher cost and higher performance is specified in the request. As such, the system (500) may include a ledger (508) that includes performance statistics for each registered node (516) for each completed computing assignment. That is, based on the usage patterns and performance statistics of registered nodes (516), the system (500) may place different registered nodes (516) into a set to execute a particular computing task.

Examples of statistics that are collected include reliability information, information indicating a percentage of time the registered node (516) is available, network performance for the registered node (516), count and duration of the registered node (516) going down, an average load for the registered node (516), etc. While particular reference is made to particular performance statistics, any variety of statistics may be collected for each of the registered nodes (516). As described above such information may be criteria by which the system (500) selects registered nodes (516) to form the set and/or may be disclosed to the requesting device (512), such that the requesting device (512) is aware of the services they are to be provided. As such, the ledger (508) provides an auditable record of all transactions of each registered node (516).

In an example, the system (500) is a machine learning system. Specifically, the system (500) may predict registered node (516) availability and may make optimizations to make transactions faster and audit edge security. A specific example of operation of the system (500) is now provided from the standpoint of the system (500), requesting device (512), and registered node (516).

First, the system (500) may provide an interface where unregistered nodes (517) may register resources for use by a requesting device (512). As such, an unregistered node (517) accesses the user interface and registers. The system (500) provides a download package for the now registered node (516) that installs the container image and hypervisor (518) on the registered node (516). The package is installed and the container initialized. At this point, the system (500) collects quality of service parameters such as allowed capacity for CPU, RAM, storage, network etc. from each registered node (516). The hypervisor (518) of that registered node (516) registers with the system (500) and is added to the available capacity pool (514). During, and following completion of a computing assignment, the system (500) collects quality of service metrics and usage patterns for each registered node (516).

Turning to the requesting device (512), the requesting device (512) may also register with the system (500) and create a request for the computing task that may be distributed across a set of registered nodes (516). As described, the request may include certain parameters by which a set of assigned nodes is selected. The system (500) selects registered nodes (516) from the pool (514) and forms a private network that includes the set of assigned nodes and the system (500). Task data and processes are downloaded to each assigned node of the set and each assigned node processes an assignment and communicates back to the system (500) when an assignment is completed. The requesting device (512) then receives a completed task from the system (500).

Turning now to the registered nodes (516). Following installation of a hypervisor (518), the registered node (516) connects to the system (500) user interface to register and receive an allocated assignment. When an assignment is assigned, the assigned node registers network interfaces to join the private assigned node network and download data and process. As described above, the tasks are downloaded and run in isolation in the container in the assigned node and all communication to and from the system (500) is via the hypervisor (518). The hypervisor (518) collects quality of service-related performance and availability metrics and transmits these to the system (500). Upon completion, the hypervisor (518) may reset the container to ensure all data for the computing assignment is deleted securely.

Figure 6:
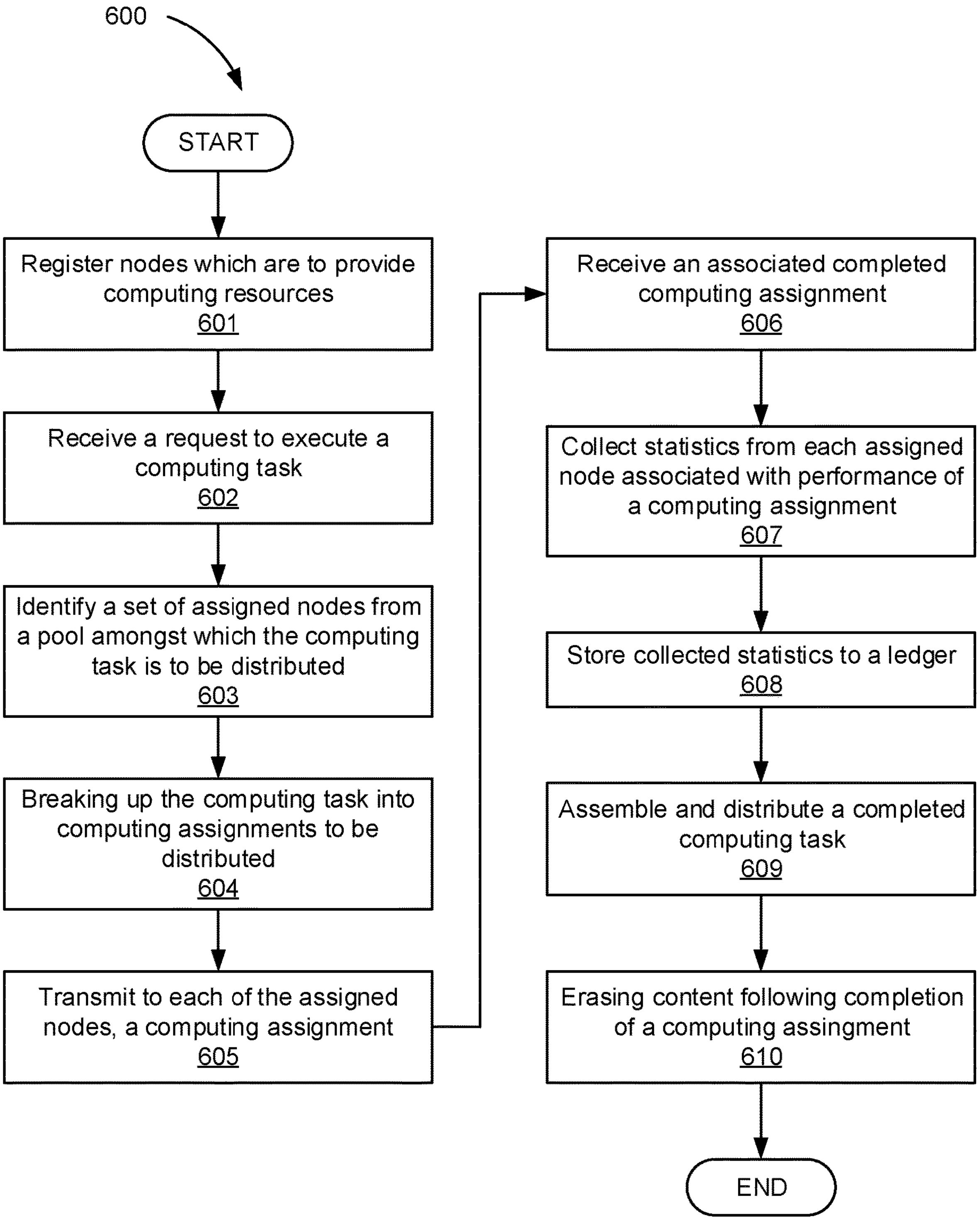
FIG. 6 depicts a computer-implemented method for distributing a computing task amongst multiple registered nodes, according to an example of the principles described herein.

FIG. 6 depicts a computer-implemented method (600) for distributing a computing task amongst multiple registered nodes (FIG. 5, 516), according to an example of the principles described herein. According to the method (600), the system (FIG. 5, 500) may register (block 601) nodes which are to provide computing resources to execute a computing assignment. This may be done as described above, for example via an interface where characteristics of a registered node (FIG. 5, 516) are entered into a database (FIG. 5, 502). That is, registration (block 601) may include collecting an inventory of assets of each registered node (FIG. 5, 516) and an availability of each asset. In some examples, registration may include predicting an availability of each asset of each registered node (FIG. 5, 516). That is, a registered node (FIG. 5, 516) may include any variety of monitors to track hardware usage, hardware identification information etc. In an example, the system (FIG. 5, 500) may extract this data to predict when hardware resources will be available for use in executing a computing assignment.

According to the method (600), the system (FIG. 5, 500) receives (block 602) a request to execute a computing task and identifies (block 603) a set of assigned nodes from a pool (FIG. 5, 514), amongst which the computing task is to be distributed. These operations may be performed as described above in connection with FIG. 4.

The method (600) may include breaking up (block 604) the computing task into computing assignments to be distributed. That is, as described above, the system (FIG. 5, 500) may be a machine-learning system that intelligently breaks up a computing task into multiple computing assignments.

The method (600) includes transmitting (block 605) to each of the assigned nodes, a computing assignment. As described above, such transmission (block 606) may be to an isolated container. As described above, containerized images of the data set may run on the selected and assigned nodes. In this example, the system (500) may also specify a network location that hosts multiple datasets that are to be processed. Each assigned node may download a specific dataset, while agreeing to complete it within the calculated time based on the compute capacity and resources available at the assigned node.

Following completion of an assignment, the system (FIG. 5, 500) receives (block 606) an associated completed computing assignment. This may be performed as described above in connection with FIG. 4.

In an example as described above, the system (FIG. 5, 500) collects (block 607) statistics from each assigned node associated with performance of an associated computing assignment and stores (block 608) collected statistics to a ledger (FIG. 5, 508). Such information may be used in subsequent allocation of computing assignments to registered nodes (FIG. 5, 516).

As described above, following completion of a computing task and assignment, the content and/or data set associated with a task may be erased (block 610). In an example, this may include deleting the secured and isolated containers following completion of a computing assignment. In another example, this may include clearing the secured and isolated containers following completion of a computing assignment. In either example, the data set security is protected 1) by virtue of the isolated container and 2) due to the deletion of the data and/or container stored on the registered node (FIG. 5, 516).

Figure 7:
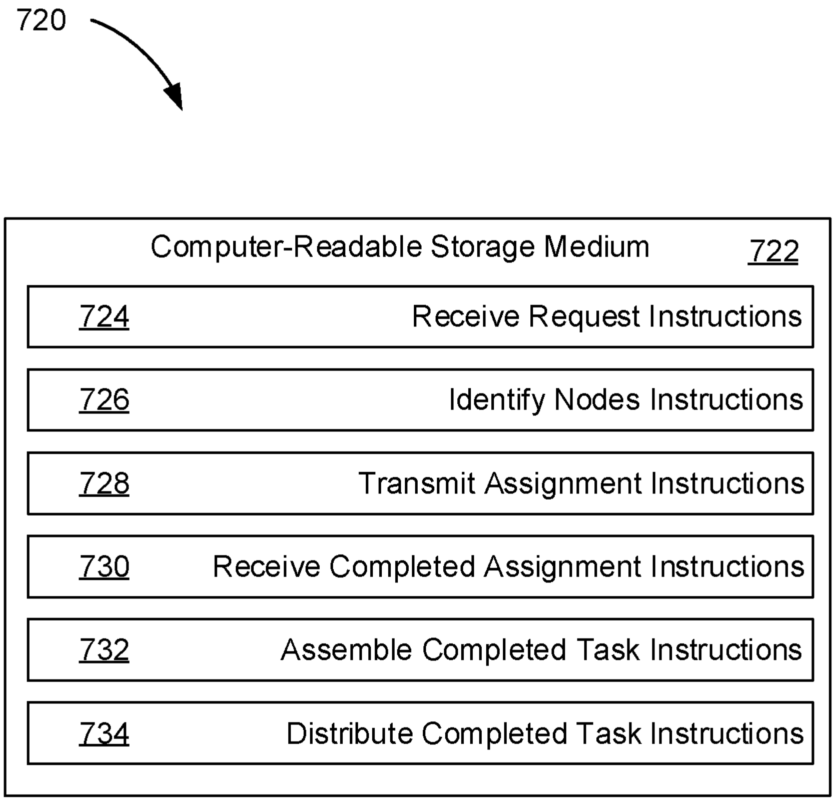
FIG. 7 depicts a computer program product with a computer readable storage medium for distributing a computing task amongst multiple registered nodes, according to an example of principles described herein.

FIG. 7 depicts a computer program product (720) with a computer readable storage medium (722) for distributing a computing task amongst multiple registered nodes (FIG. 5, 516), according to an example of principles described herein. To achieve its desired functionality, the system (FIG. 5, 500) includes various hardware components. Specifically, a computing system includes a processor and a computer-readable storage medium (720). The computer-readable storage medium (720) is communicatively coupled to the processor. The computer-readable storage medium (720) includes a number of instructions (724, 726, 728, 730, 732, 734) for performing a designated function. The computer-readable storage medium (722) causes the processor to execute the designated function of the instructions (724, 726, 728, 730, 732, 734).

Referring to FIG. 7, receive request instructions (724), when executed by the processor, cause the processor to receive a request to execute a computing task, which computing task includes parameters for the computing task. Identify nodes instructions (726), when executed by the processor, may cause the processor to identify, based on the parameters for the computing task, a set of assigned nodes from a pool (FIG. 5, 514) of registered nodes (FIG. 5, 516) amongst which the computing task is to be distributed. Transmit assignment instructions (728), when executed by the processor, may cause the processor to transmit to a secure and isolated container on each of the assigned nodes, a computing assignment of the computing task. Receive completed assignment instructions (730), when executed by the processor, may cause the processor to receive from each of the assigned nodes, an associated completed computing assignment. Assemble completed task instructions (732), when executed by the processor, may cause the processor to assemble a completed computing task from associated completed computing assignments. Distribute completed task instructions (734), when executed by the processor, may cause the processor to distribute the completed computing task to a requesting device (FIG. 5, 512).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. In one example, the computer usable program code may be embodied within a computer readable storage medium; the computer readable storage medium being part of the computer program product. In one example, the computer readable storage medium is a non-transitory computer readable medium.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

registering, by a computing device, nodes with a pool of registered nodes in response to receiving registration requests from node users;

receiving, by the computing device, a request to execute a computing task, wherein the request comprises parameters for the computing task, and wherein the parameters for the computing task comprises a security level of the computing task associated with data being acted on by the computing task;

assigning, by the computing device, and based on the parameters for the computing task and from the pool of registered nodes, a set of nodes that comply with the security level amongst which the computing task is to be distributed in response to receiving the request, wherein the assigning is performed using a machine-learning system configured to utilize a ledger of performance statistics for each registered node for each completed computing assignment to predict availability of computing resources of registered nodes and determine the set of nodes;

creating, by the computing device, a virtual private network amongst the set of nodes and the computing device;

dividing, by the computing device, based on the parameters for the computing task, the computing task into two or more computing assignments;

transmitting, by the computing device and to a secure and isolated container on each assigned node of the set of nodes, a computing assignment of the two or more computing assignments based on a policy indicating ability of registered nodes to receive the two or more computing assignments, wherein each secure and isolated container is created for the computing assignment and managed by a hypervisor according to the parameters associated with the computing task, wherein each assigned node registers a network interface to join the virtual private network, and wherein communications between each assigned node and the computing device for the computing assignment are via the hypervisor;

receiving, by the computing device and from each assigned node of the set of nodes, an associated completed computing assignment, wherein each hypervisor deletes or clears the secure and isolated container in response to computing assignment completion and removes itself from the virtual private network; and assembling, by the computing device, completed computing assignments associated with each assigned node of the set of nodes into a completed computing task and distributing the completed computing task to a requesting device.

2. The computer-implemented method of claim 1, wherein parameters for the computing task further comprise at least one of:

processing resources to be utilized to execute the computing task;

memory resources to be utilized to execute the computing task;

a quantity of assigned nodes to include in the set; and a time to completion for the computing task.

3. The computer-implemented method of claim 1, further comprising breaking up, by the computing device, the computing task into the two or more computing assignments to distribute to each of the set of nodes.

4. The computer-implemented method of claim 1, further comprising collecting, by the computing device, statistics from each assigned node of the set of nodes associated with performance of an associated computing assignment.

5. The computer-implemented method of claim 4, further comprising storing, by the computing device, collected performance statistics to the ledger for subsequent allocation of the two or more computing assignments to the set of registered nodes.

6. The computer-implemented method of claim 1, further comprising clearing, by the computing device, data within the secured and isolated containers following completion of a computing assignment.

7. A computing device, comprising:

a database of capabilities and usage of registered nodes to which computing assignments of a computing task are to be distributed;

a processor to:

register nodes with a pool of registered nodes in response to receiving registration requests from node users;

analyze a request to execute a computing task, wherein the request comprises parameters for the computing task, and wherein the parameters for the computing task comprises a security level of the computing task associated with data being acted on by the computing task;

assign, based on the request and capabilities of registered nodes, a set of nodes from the pool of registered nodes that comply with the security level amongst which the computing task is to be distributed in response to receiving the request, wherein the assigning is performed using a machine-learning system configured to access the database and utilize a ledger of performance statistics for each registered node for each completed computing assignment to predict availability of computing resources of registered nodes and determine the set of nodes;

set up a private assigned-node communication network between the set of nodes and the computing device;

assemble completed computing assignments into a completed computing task; and distribute the completed computing task to a requesting device; and a transceiver to:

divide, based on the parameters for the computing task, the computing task into two or more computing assignments;

transmit, to a secure and isolated container on each assigned node of the set of nodes, a computing assignment of the two or more computing assignments based on a policy indicating ability of registered nodes to receive the two or more computing assignments, wherein the secure and isolated container is not accessible by other applications of each assigned node and is incapable of accessing the other applications of each assigned node, and wherein each secure and isolated container is created for the computing assignment and managed by a hypervisor according to the parameters associated with the computing task, wherein each assigned node registers a network interface to join the private assigned-node communication network, and wherein communications between each assigned node and the computing device for the computing assignment are via the hypervisor; and receive, via the hypervisor of each assigned node, from each assigned node of the set of nodes, an associated completed computing assignment, wherein each hypervisor deletes or clears the secure and isolated container in response to computing assignment completion and removes itself from the private assigned-node communication network; and assemble, completed computing assignments associated with each assigned node of the set of nodes into a completed computing task and distribute the completed computing task to a requesting device.

8. The computing device of claim 7, wherein the registered nodes make up a private network.

9. The computing device of claim 7, wherein the registered nodes make up a public network.

10. The computing device of claim 7, wherein the processor is to provide an install package for a hypervisor to be installed on an assigned node of the set of nodes to manage execution of the computing assignment at the assigned node.

11. The computing device of claim 7, wherein the processor is to manage the addition and removal of assigned nodes from the set of nodes.

12. The computing device of claim 7, wherein the private assigned-node communication network permits different assigned nodes of the set of nodes to communicate with one another or with the computing device.

13. The computing device of claim 7, wherein the processor is to prevent a registered node from forming part of the set of nodes responsive to the registered node having completed a previous computing assignment for the requesting device.

14. The computing device of claim 7, wherein the ledger comprises at least one: of reliability information, availability information indicating a percentage of time a registered node is available, network performance information, count and duration information indicating the registered node going down, or average load information.

15. A computer program product, the computer program product comprising a computer readable storage medium having program instructions embodied therewith, the program instructions executable by a processor, to cause the processor to:

registering, by the processor, nodes with a pool of registered nodes in response to receiving registration requests from node users;

receive, by the processor, a request to execute a computing task, wherein the request comprises parameters for the computing task, and wherein the parameters for the computing task comprises a security level of the computing task associated with data being acted on by the computing task;

assign, by the processor and based on the parameters for the computing task, a set of nodes from the pool of registered nodes that comply with the security level amongst which the computing task is to be distributed in response to receiving the request, wherein the assigning is performed using a machine-learning system configured to utilize a ledger of performance statistics for each registered node for each completed computing assignment to predict availability of computing resources of registered nodes and determine the set of nodes;

establish, by the processor, a private assigned-node network including the set of nodes and the processor, divide, by the processor and based on the parameters for the computing task, the computing task into two or more computing assignments;

transmit, by the processor and to a secure and isolated container on each assigned node of the set of nodes, a computing assignment of the two or more computing assignments based on a policy indicating ability of registered nodes to receive the two or more computing assignments, wherein each secure and isolated container is created for the computing assignment and managed by a hypervisor according to the parameters associated with the computing task, wherein each assigned node is caused to register a network interface to join the private assigned-node network, and wherein communications between each assigned node and the processor for the computing assignment are routed via the hypervisor;

receive, by the processor and via the hypervisor of each assigned node, from each assigned node of the set of nodes, an associated completed computing assignment, wherein each hypervisor deletes or clears the secure and isolated container in response to computing assignment completion and removes itself from the private assigned-node network;

assemble, by the processor, a completed computing task from associated completed computing assignments; and distribute, by the processor, the completed computing task to a requesting device.

16. The computer program product of claim 15, further comprising program instructions executable by the processor, to cause the processor to register nodes which are to provide computing resources to execute a computing assignment.

17. The computer program product of claim 16, wherein registration comprises collecting an inventory of assets of each node and an availability of each asset.

18. The computer program product of claim 17, wherein registration comprises predicting the availability of each asset of each node.

19. The computer-implemented method of claim 1, further comprising executing, by the computing device, the computing assignment within the secure and isolated container on an assigned node, wherein operations or applications within the secure and isolated container are inaccessible to other resources of the assigned node, and wherein the other resources of the assigned node are inaccessible to the hypervisor.

* * * * *